United States Patent [19]

Schyboll et al.

[11] Patent Number: 5,340,094

[45] Date of Patent: Aug. 23, 1994

[54] HYDRAULIC DAMPING ELASTOMERIC BEARING

[75] Inventors: Georg Schyboll, Sinzig-Westum; Heinrich Mayerböck, Kirchdaun, both of Fed. Rep. of Germany

[73] Assignee: Boge AG, Eitorf, Fed. Rep. of Germany

[21] Appl. No.: 46,049

[22] Filed: Apr. 9, 1993

[30] Foreign Application Priority Data

Apr. 13, 1992 [DE] Fed. Rep. of Germany ....... 4212311
Jun. 2, 1992 [DE] Fed. Rep. of Germany ....... 4218110

[51] Int. Cl.$^5$ .............................................. F16M 5/00
[52] U.S. Cl. ............................ 267/219; 267/140.13
[58] Field of Search ............ 267/140.13, 140.3, 140.4, 267/141, 141.2, 219, 220; 248/562, 636; 180/902, 312, 300

[56] References Cited

U.S. PATENT DOCUMENTS

| | | | |
|---|---|---|---|
| 4,836,513 | 6/1989 | Kramer et al. | 267/140.13 |
| 4,887,801 | 12/1989 | Wolf et al. | 267/140.13 |
| 5,102,105 | 4/1992 | Hamaekers et al. | 267/140.13 |

FOREIGN PATENT DOCUMENTS

| | | | |
|---|---|---|---|
| 0298862 | 1/1989 | European Pat. Off. | 267/140.13 |
| 3831816 | 3/1989 | Fed. Rep. of Germany | |
| 2237355 | 5/1991 | United Kingdom | 267/140.13 |

*Primary Examiner*—Robert J. Oberleitner
*Assistant Examiner*—Lee W. Young
*Attorney, Agent, or Firm*—Nils H. Ljungman & Associates

[57] ABSTRACT

A hydraulic damping elastomeric bearing has at least two chambers containing damping fluid located axially one behind the other. At least one of the at least two chambers has a circumferential wall designed as an elastic spring element, and the at least two chambers are in communication with one another by means of at least one throttle passage located in a partition between the at least two chambers. The bearing has a single, one-piece component which provides various functions of the bearing, such as, an equalization chamber, a part of the partition, and/or a seal for the throttle point, and/or simultaneously a decoupling membrane.

11 Claims, 5 Drawing Sheets

HYDRAULIC DAMPING ELASTOMERIC BEARING

BACKGROUND OF THE INVENTION

1. Field of the Invention

This invention relates to a hydraulic damping elastomeric bearing having two rigid end walls opposite to one another in the axial direction of the bearing. The bearing also has at least two cheers containing damping fluid, located axially one behind the other between the rigid end walls. At least one of the chambers has a circumferential wall designed as an elastic spring element, and the chambers can be in communication with one another by means of at least one throttle passage located in a partition between the chambers.

2. Background Information

Known elastomeric bearings of this type, for example, the bearing disclosed in German Laid Open Patent Application No. 38 31 816, have the two chambers in communication with one another by means of at least one throttle passage located in the partition that separates the chambers. In addition, the second chamber is bordered by an elastic membrane in the form of an equalization cheer. Between the two fluid filled chambers there can be a decoupling, or anti-resonance membrane in the vicinity of the partition. On such an elastomeric bearing, there is provided a special, separate component for performing each function, as described above, which components include the equalization chamber, the throttle passage, and the decoupling membrane. Each of these separate parts provides the characteristic properties for the function in question. Assembly of such a bearing is therefore complicated and rather time consuming because of the fact that numerous parts have to be arranged and then assembled together. Such a bearing is also generally more expensive because of the numerous parts and the extra precision required for assembly of all of the parts.

OBJECT OF THE INVENTION

The object of the invention is to simplify a hydraulic damping elastomeric bearing so that the bearing can be manufactured more economically, and so that several functions of the elastomeric bearing can be performed by a corresponding suitable component which replaces the individual separate components as discussed above.

SUMMARY OF THE INVENTION

This object is achieved according to the present invention in that at least a portion of at least one of the fluid chambers and at least a portion of the partition separating the fluid chambers are preferably designed as a one-piece component.

An advantage of this configuration is that the one-piece component can at least partly border the throttle passage, and can simultaneously be designed as a decoupling membrane and/or as an equalization chamber. All of these above-mentioned functions can essentially be performed by the one-piece component. Thus, not only is the number of components reduced, but the complexity of the bearing, in addition to the effort and expense of assembly and installation, can be reduced as well. In accordance with an additional essential feature, the one-piece component can be manufactured from an elastic material.

In addition, the one-piece component can also include at least a part of the wall that defines the throttle passage.

To further reduce the manufacturing effort and expense without reducing the functional capabilities of the elastomeric bearing, one configuration of the invention discloses that the partition can be formed by at least two metal parts and the one-piece component. In this case, the metal parts can advantageously be designed in the form of discs, and the throttle passage can run in a ring-like fashion around the bearing axis.

In one configuration of the invention, one metal part can be designed as the outer part for the throttle passage, and an additional metal part can be designed as the inner part for the throttle passage. On account of the use of simple sheet metal parts, it is possible in terms of manufacturing to form the throttle passage directly into the metal parts by non-cutting manufacturing methods. This throttle passage would preferably be in the form of a passage running in ring-like fashion around the bearing axis.

In accordance with an additional essential feature, the one-piece component can preferably be designed to be a decoupling membrane, an equalization chamber, and a seal and fastening element. As a result of the use of a one-piece component made of elastic material, this component can perform the function of decoupling, the functions of the equalization chamber, and the function sealing the equalization cheer in relation to the housing, and sealing the throttle passage in relation to at least one of the two chambers.

To achieve a defined excursion, or movement distance for the decoupling, one configuration of the invention specifies that one of the metal parts can act as a stop for the decoupling membrane.

In a particularly favorable embodiment, one of the end walls can preferably have a contour running directly or indirectly toward the partition to form a stop for the decoupling membrane. The stop for the decoupling membrane can thereby be formed directly by the contour of the end wall, or by additional simple components, e.g. made of plastic or a similar material, inserted into the end wall. In this manner the second stop can be formed with an axially defined play for the decoupling membrane.

To achieve a stabilized decoupling, that is, a decoupling in which the decoupling membrane cannot be induced to vibrate resonantly, an additional feature of the invention specifies that the one-piece component can be positively fixed in the vicinity of the bearing axis of the elastomeric bearing between one of the metal parts of the partition and one of the end walls.

To achieve a further simplification and reduction of the number of components, an additional feature of the invention provides that when the throttle passage runs a in ring-like fashion around the bearing axis, a part of the one-piece component can preferably project into the throttle passage and separate the throttle entry and exit openings from one another. The one-piece component can advantageously have, in a specified area, a material projection which, when the partition is assembled, can provide the throttle passage with a specified passage length. The one-piece component can also advantageously be equipped with a bypass located parallel to the throttle passage, and can preferably be located in the projection separating the entry and exit openings.

In one configuration of the invention, when a bypass running parallel to the throttle passage is used, the bypass can preferably be made to operate as a function of the pressure. In this case, the bypass which operates as a function of the pressure can be designed as an elastomeric lip which can move in at least one direction. An advantage here is that when there is a specified pressure in one of the two work chambers, the bypass can open to reduce the pressure, thereby preventing cavitation (production of partial vacuums), or preventing an underpressure.

In an additional embodiment, the decoupling membrane can be located centrally and the equalization chamber can run in ring-like fashion around the bearing axis. Alternatively, the decoupling membrane can run in ring-like fashion around the bearing axis and the equalization chamber can be located centrally.

The one-piece component can also be securely fixed within the bearing if the one-piece component is buttoned into one of the disc-shaped components. In other words the one-piece component can have a portion which is pushed through an opening, which portion has a diameter which is larger than the diameter of the opening, to thereby retain the component in place.

In summary, one aspect of the invention resides broadly in a hydraulic damping elastomeric bearing for being mounted between and reducing transmission of vibration between at least two objects. The bearing comprises a first device for attaching the bearing to one of the at least two objects, a second device for attaching the bearing to another of the at least two objects, and an apparatus for connecting the first device for attaching to the second device for attaching. The connecting apparatus comprises at least one cavity disposed within the connecting apparatus, the cavity including at least two chambers, and the at least two chambers comprising damping fluid therein. The connecting apparatus further comprises a device for separating the at least two chambers, and a one-piece component which forms at least a part of the device for separating the at least two chambers, and which also forms at least a part of at least one of the at least two chambers.

BRIEF DESCRIPTION OF THE DRAWINGS

Preferred embodiments of the invention are schematically illustrated in the accompanying drawings, in which:

FIG. 6 shows a more detailed full cross sectional view of the bearing illustrated in FIG. 1a.

DESCRIPTION OF THE PREFERRED EMBODIMENTS

Figure 1A:
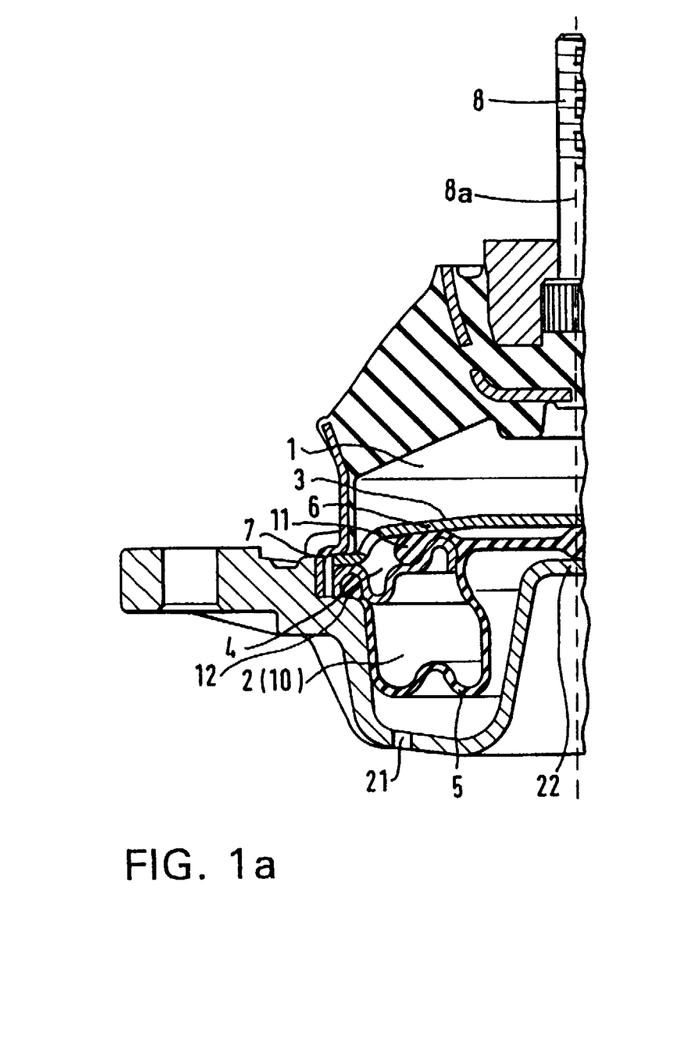
FIGS. 1a and 1b show variations of a hydraulic damping elastomeric bearing in cross section.
Figure 1B:
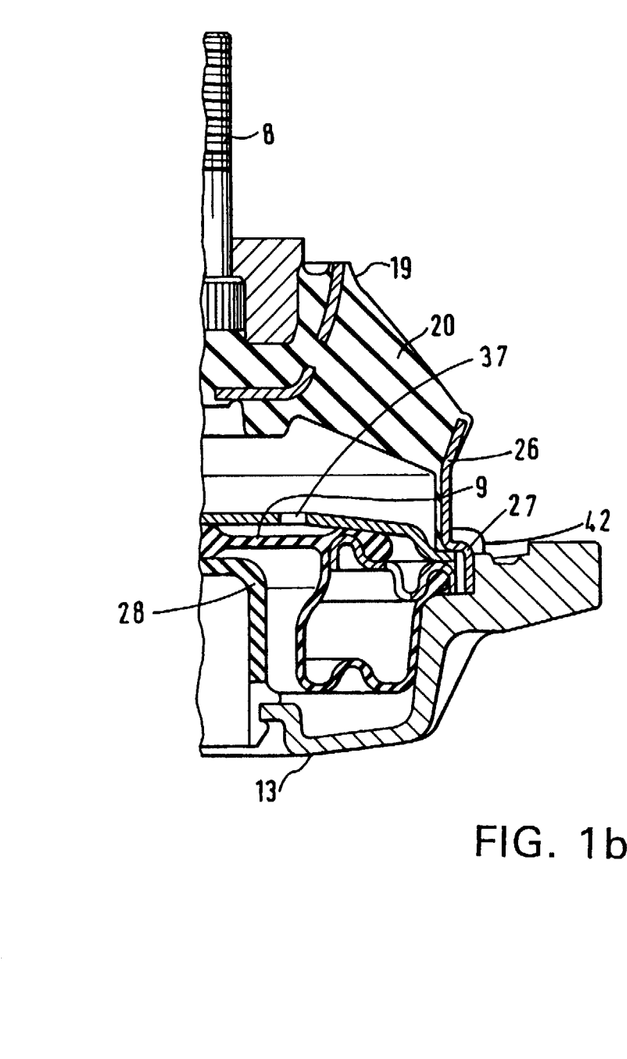

The hydraulic damping elastomeric bearing illustrated in FIGS. 1a and 1b preferably has two end walls 13 and 19 disposed essentially opposite to one another in an axial direction of the bearing. The axial direction of the bearing essentially can be defined by an axis $8a$ defined by the connecting armature 8. In this regard, the figures essentially depict a cross section of the bearing taken in a plane of the bearing axis $8a$. Each of the figures can therefore be rotationally symmetrical about the bearing axis, so that, in essence, an outer periphery of the bearing disposed circumferentially around the bearing axis could essentially be approximately circular if the bearing were to be viewed in a direction along the bearing axis. Alternatively, this outer periphery could also be elliptical, or could be of any other shape common to bearings of this type.

The end wall 19 can be equipped with an elastic resilient element, or spring element 20. There can also be a connection flange 26 to which the elastic spring element 20 can preferably be intimately bonded, which connection flange 26 can preferably be configured with a bead, or flange portion 27, which can preferably be engaged by flanges 42 of the end wall 13 to thereby close the hydraulic damping elastomeric bearing. Other types of known connection configurations could also be used to resiliently connect the end walls 13 and 19.

The elastomeric bearing can also be equipped with a partition 3 which preferably divides the interior of the bearing into at least two chambers 1 and 2. The two chambers 1 and 2 can preferably be in communication with one another by means of the throttle passage 4, which can be formed in the partition 3. In addition, the chamber 2 can preferably be equipped with a bellows, to form an expansion, or equalization chamber 10. This expansion chamber can hold the unpressurized damping fluid, The partition 3 can preferably be formed by two parts 6 and 7, which can be made of a rigid material, such as metal, or a rigid plastic material. As a result of a corresponding configuration of the two parts 6 and 7, the throttle passage 4 can be formed therebetween. In addition, a seal 11 for the throttle passage 4, can be provided between the two parts 6 and 7, can preferably be provided by a portion of a one-piece component 5. This one-piece component 5 can also have a central portion which preferably forms an anti-resonance, or decoupling membrane 9. This one-piece component can also have a bellows section for enclosing at least part of the chamber 2. In the vicinity of the bellows section, the one-piece component 5 can preferably have a fastening element 12 for fixing and sealing the bellows in relation to the lower end wall 13.

By means of corresponding holes 37 in the fastening part 6, the decoupling membrane 9 can be pressurized on one side by the damping fluid from the chamber 1. In addition, the end wall 13 can have corresponding holes 21, so that the opposite side of the decoupling membrane 9 can be acted upon by atmospheric pressure.

To achieve a stabilized decoupling, the center 22 of the decoupling membrane 9 can be positively braced between the upper part 6 of the partition 3 and the lower end wall 13. In this manner, resonance vibrations of the decoupling membrane can be prevented. To provide this bracing, or clamping function, the end wall 13, as shown in FIG. 1a, can be recessed towards the partition 3. An alternative embodiment for providing this bracing, as shown in FIG. 1b, can be achieved by using an additional part 28 which extends from the end wall 13 towards the partition 3. This additional part 28 can be formed of a rigid material, such as plastic of metal, and can be buttoned, or force fit, into the end wall 13 as shown in FIG. 1b. Alternatively, there can be allowed a limited play between the end wall 13 and the partition 3 to allow for a limited movement of the membrane 9 within this play area.

Figure 2:
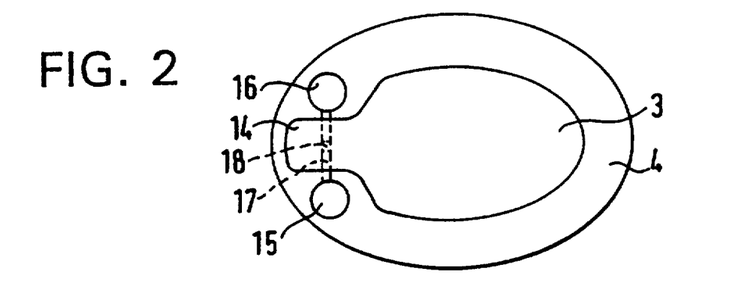
FIG. 2 shows a partition for an elastomeric bearing.
Figure 2A:
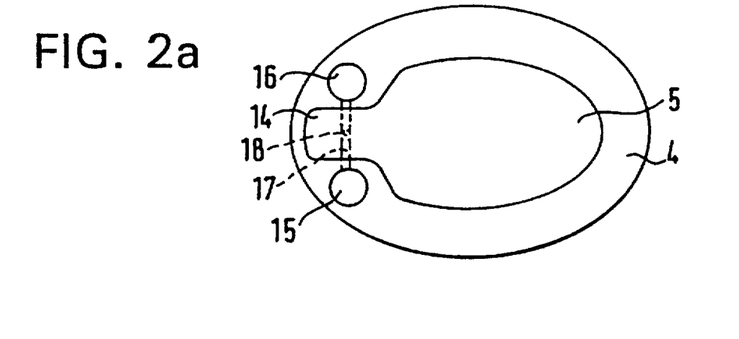
FIG. 2a shows an alternative embodiment of a partition for an elastomeric bearing.

The embodiment of the elastomeric bearing as shown in FIG. 1a is discussed in more detail below with reference to FIG. 6, which shows a full cross sectional view of the bearing, FIGS. 2 and 2a show alternative embodiments of the partition 3 in a plan view. In each of these embodiments of the partition 3, the throttle passage 4 has entry opening 15 and exit opening 16 for providing fluid access to each of the chambers 1 and 2. To provide a corresponding, or substantially uni-directional flow of damping fluid along the ring-shaped throttle passage 4 from one chamber 1 or 2 to the other chamber, via the corresponding openings 15 and 16, the one-piece component can have a projection 14, designed to close off at least a portion of the throttle passage 4 in a partial area between the two openings 15 and 16, as shown in FIG. 2a. Alternatively, the partition 3 could comprise the projecting portion 14 for blocking the throttle passage 4 between the two openings 15 and 16.

The projection 14 could alternatively extend completely across the throttle passage 4 to completely block the throttle passage 4 in one direction around the throttle passage, thereby forcing fluid flow in the other direction around the throttle passage between the openings 15 and 16. In such a configuration, the projection 14 can preferably have a bypass 17 disposed therein, which can be either constantly open or equipped with a valve. In the embodiment illustrated in FIGS. 2 and 2a, the bypass 17 is equipped with a lip 18, preferably made of elastomer, i.e. the see elastomer as the one-piece component 5. This lip can preferably be configured to move in both directions when the pressure increases above a specified level, so that the bypass 17 can open as a function of the pressure.

Figure 3:
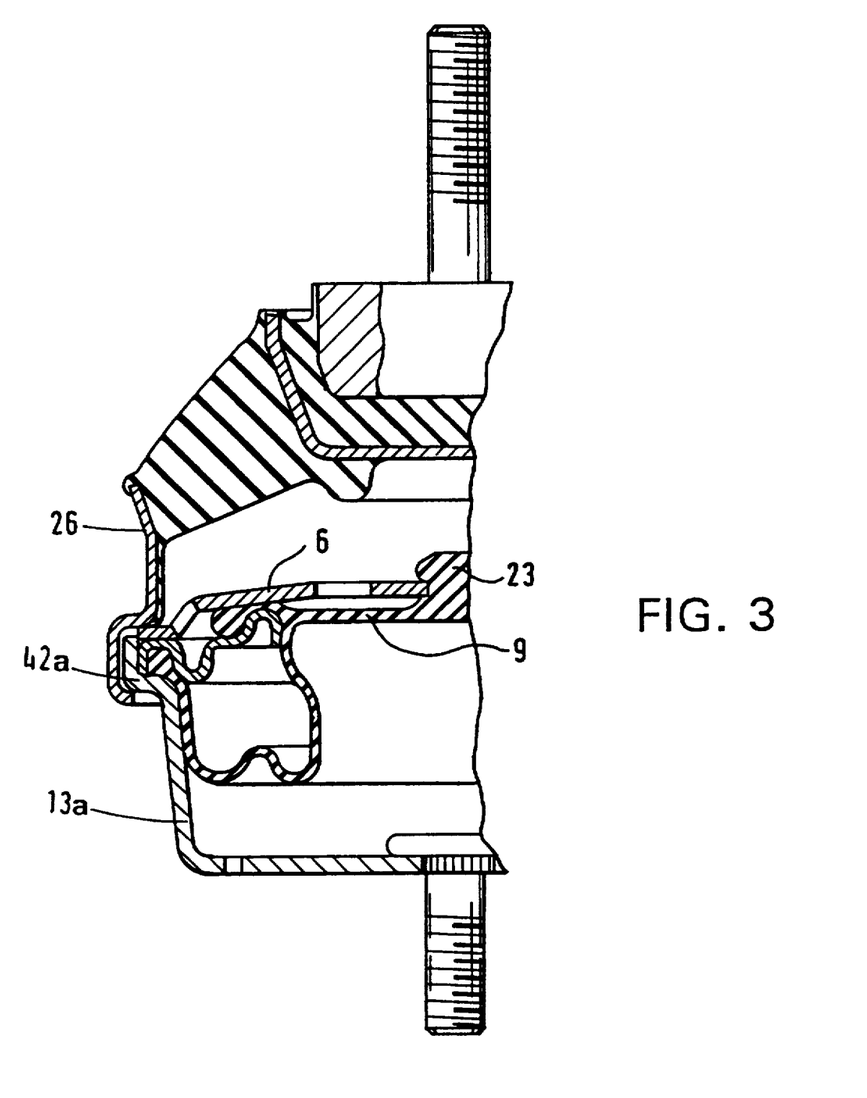
FIGS. 3-5 show additional embodiments of elastomeric bearings with corresponding partitions.

FIG. 3 depicts an embodiment which is the same in principle as the embodiments of FIGS. 1a and 1b, however having the distinction that the decoupling membrane can be in the loren of a button element 23 forced through an opening in the disc-shaped part 6. In this embodiment, the decoupling membrane can be stabilized by the element 23, which rigidly retains the decoupling membrane against the part 6 of the partition 3. The lower end wall 13a can then be configured as a simple bowl-shaped component.

FIG. 3 also shows that the flange 26 can be crimped about the flange 42a of the lower end wall 13a to retain the bearing assembly together.

Figure 4:
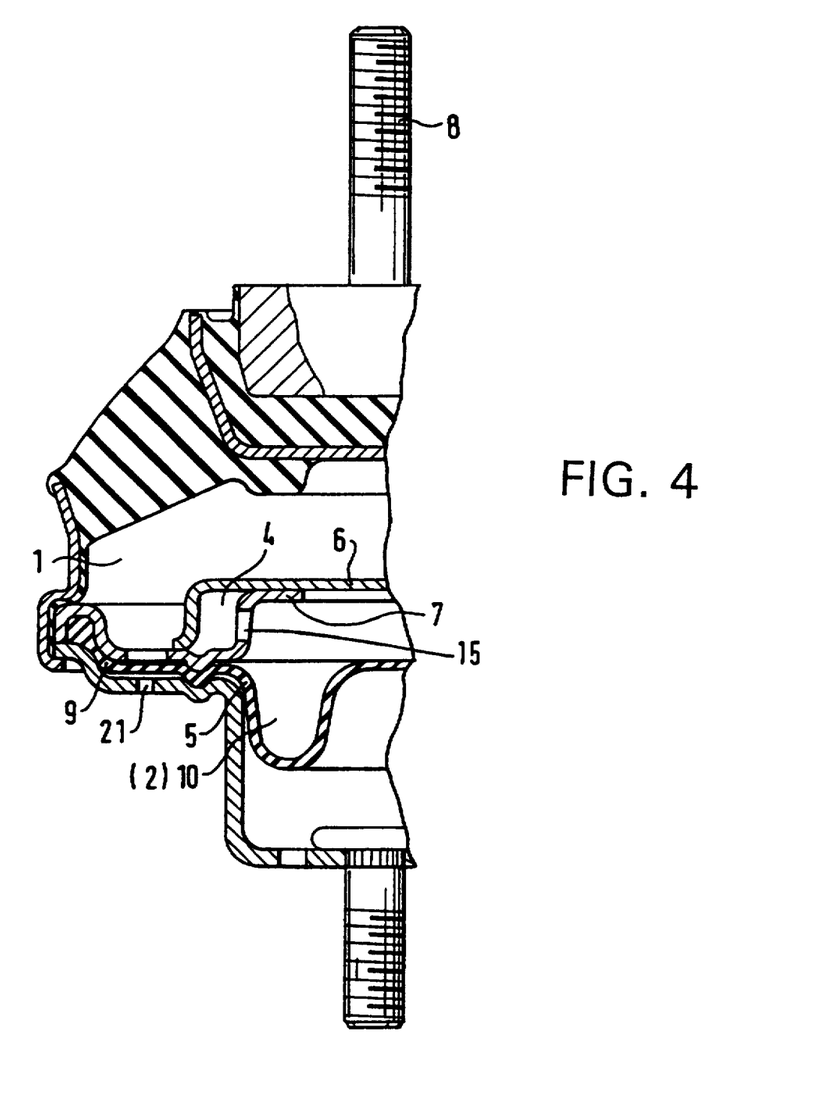

FIG. 4 shows an elastomeric bearing in which the one-piece component 5 forms the equalization chamber 10 in the center of the bearing. The decoupling membrane 9 can then preferably run in ring-like fashion around the equalization chamber 10. The chamber behind the decoupling membrane 9 can be vented to the atmosphere through the hole 21. The area of the decoupling surface of the decoupling membrane 9 is positively fixed and/or form-fitted radially inside and outside. The two parts 6 and 7 of the partition 3, in this configuration preferably permanently attached together before assembly, can form the throttle passage 4 in a manner in which the throttle passage 4 runs in ring-like fashion around the bearing axis 8a. This throttle passage 4 can also be provided with corresponding entry and exit openings (only one opening 15 is shogun) for the chamber 1 and the chamber 2 or the equalization chamber 10.

Figure 5:
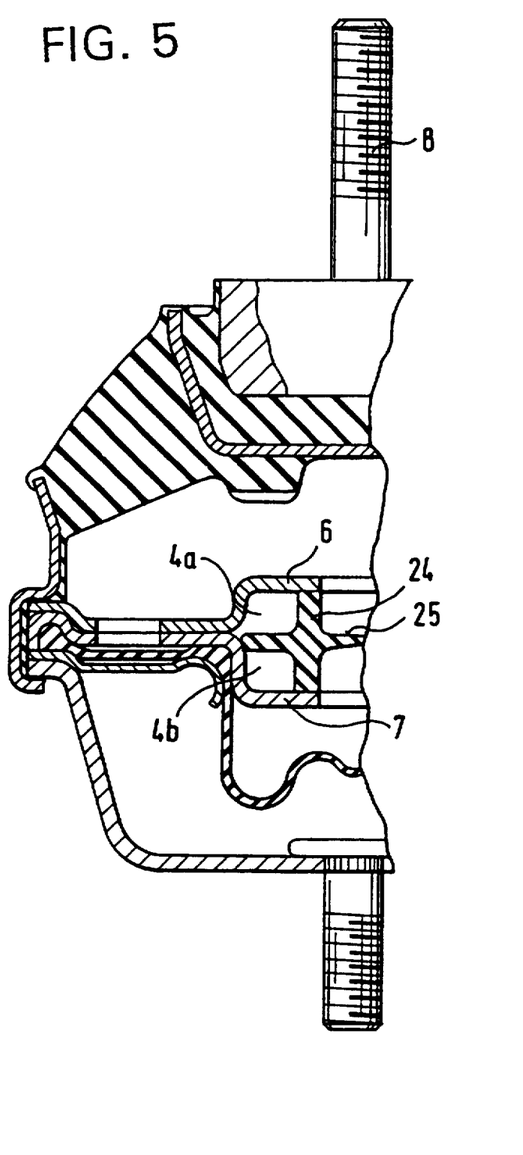

FIG. 5 shows an elastomeric bearing which is essentially the same in principle as the bearing illustrated in FIG. 4, with the distinction that there can be a passage part 24 between the metal parts 6 and 7. This passage part 24 can be configured to provide the throttle passage 4. In this part 24, the parts 4a and 4b can preferably be circular so that the throttle passage 4 forms two turns around the bearing axis 8a, or passes through about 720°. Each part 4a and 4b respectively can be provided with an entry opening and an exit opening in communication with a chamber 1 or 2, while the parts 4a and 4b can also be in communication with one another. In the center 25 of the passage part 24, a bypass 17 (not shown) can be introduced, which can either be open or equipped with a valve which operates as a function of the pressure.

The overall construction of the embodiment of the invention as shown in FIG. 1a will now be discussed in more detail, with reference to FIG. 6, which is merely a fully detailed representation of the entire cross section of the bearing shown in FIG. 1a.

Figure 6:
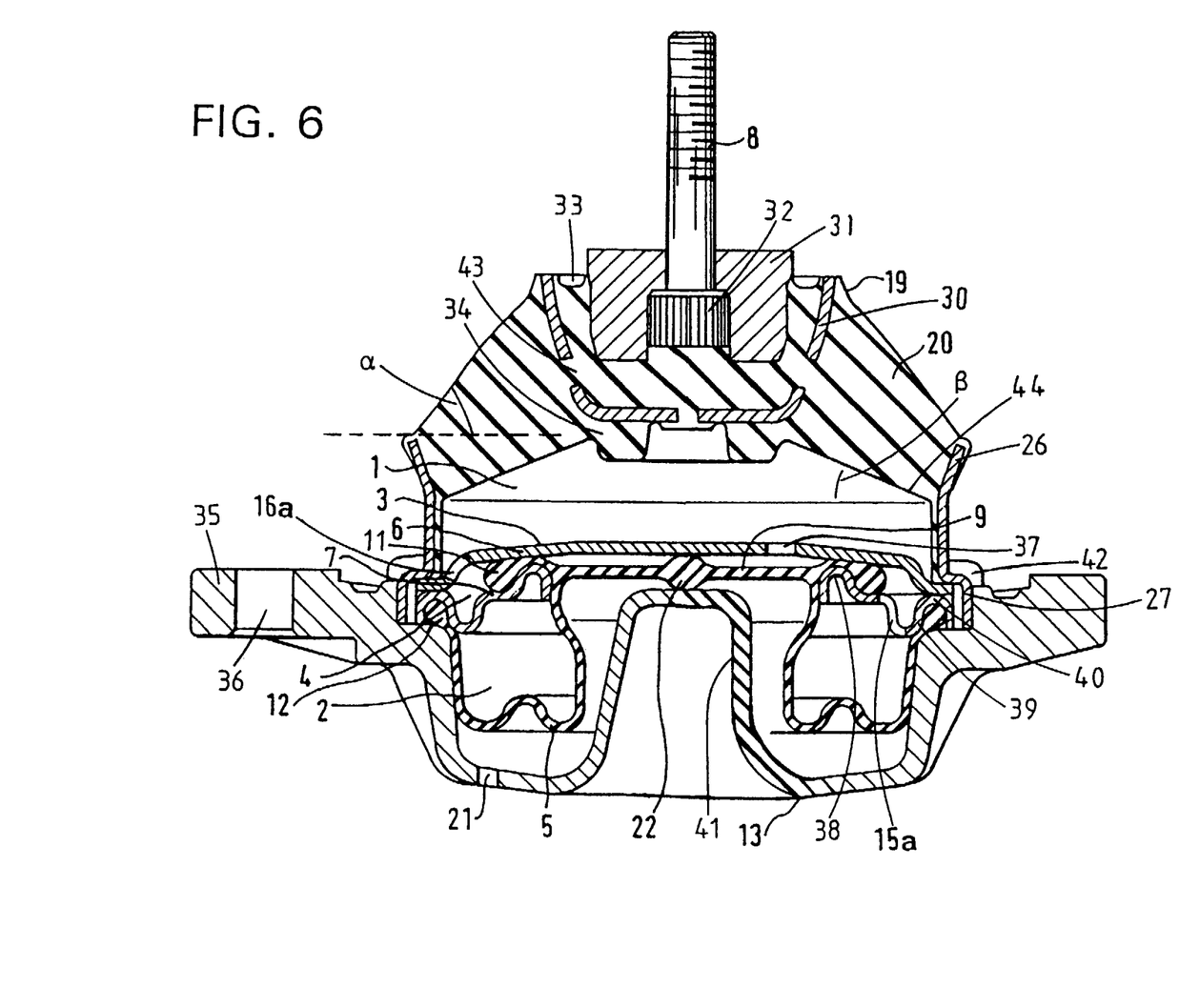

In the embodiment shown in FIG. 6, the upper portion of the bearing, as oriented in FIG. 6, essentially comprises the elastomeric block, or spring element 20. In the central region of this spring element 20, there can preferably be embedded a reinforcement armature 30. This reinforcement armature 30 can essentially be cup shaped and, as shown, need not be contiguous be contiguous throughout, but can have openings or holes 43 therein for an integral bonding of the elastomeric material which comprises the spring element 20. Thus, the spring element 20 can essentially be integrally bonded to the reinforcement armature 30 during formation of the spring element 20, as the elastomeric material can be forced through the openings 43 to provide an integral elastomeric block.

As shown in FIG. 6, the elastomeric element can be conical in shape, increasing in thickness towards the center, or apex, of the cone. In relation to a horizontal plane passing through the bearing, the bottom surface surface 44 can be inclined at an angle of conicity of about 24°, as represented by symbol "beta". On the other hand, the upper surface, forming the end wall 19, can be inclined at an angle of conicity of about 53° with respect to the horizontal plane, as represented by the symbol "alpha". It should however be understood that these angles are only exemplary, and that numerous other angular configurations could be used depending on the desired characteristics of the bearing. Some of these characteristics could include the desired resilience of the spring block 20, as well as the size of the chamber 1, for example.

At the apex, or top, of the spring element 20, there can preferably be embedded in the spring block 20, a fastening arrangement for fastening the bearing to an object, such as an engine. This upper fastening arrangement can essentially be formed from a bolt 8 disposed within a block 31. This block 31 could preferably be made of metal, or even a rigid plastic material, depending on the stresses which the bearing will be subjected to. The bolt 8 can preferably be held in a fixed, non turnable manner by means of ridges 32 disposed on preferably each of the bolt head portion and the internal wall of the block 31. The ridges of the bolt head portion would then engage between the ridges of the block 31 to keep the bolt 8 from turning within the block 31 during either a fastening, or an unfastening operation in installing or removing the bearing.

Between the block 31 and the armature 30, at the upper surface of the elastomer forming the spring element 20, there can be slightly recessed portion 33. This recessed portion 33 could serve as an expansion space for deformation of the elastomeric material between the block 31 and the armature 30. Thus, during a lateral movement of the bolt 8 towards the armature 30, the elastomeric material therebetween can deform into the space 33.

At the bottom surface 44 of the spring element 20, there can be protruding portions 34, which could possibly function as stops during severe axial deformations of the bearing. These portions 34 could provide a cushioned damping of a contact between the bottom surface 34 of the spring block 20 and the partition 3.

As shown in FIG. 6, the part 6 of the partition 3 can be slightly domed upwardly, while the part 7 can be multi-curved, with a portion 39 extending away from the part 6 to form the throttle passage 4 therebetween. The part 7, as shown in FIG. 6, can essentially have three U-shaped portions 38, 39 and 40, to thereby form the necessary sealing portions and the throttle passage 4. About the outermost circumferential portion of part 7, the U-portion 40 can be disposed downwardly to provide an engagement area for receiving the bead 12 of the one-piece component 5. Immediately adjacent the U-portion 40, toward the center of the part 7, there can be the U-portion 39 disposed upwardly to forth the throttle passage 4. This U-portion 39 could essentially be configured, with respect to the part 6, to provide various sizes of throttle passage 4. Further inward toward the center of the part 7, there can be the additional U-portion 38 for providing a sealing area for sealing off the throttle passage 4, by clamping the bead, or seal 11 of the one-piece component 5 between the U-portion 38 and the part 6.

For one embodiment of the throttle passage 4, as shown in FIG. 6, the throttle passage can extend about the circumference of the bearing through an angle of about 180°. In this regard, the part 6 can have a first opening 16a towards the cheer 1, on the left side of the bearing, while the part 7 can have a second opening 15a towards the cheer 2, thereby providing a communication passage between the cheers 1 and 2. Alternatively, depending on the desired length of the throttle passage 4, the throttle passage could extend around almost the full circumference of the bearing, as depicted in FIG. 2, or, on the other hand, could extend around less than 180° of the circumference (not shown).

The bottom end wall 13 can be cup shaped, as shown in FIG. 6, with a protruding center portion 41 extending towards the partition 3. Such a configuration essentially provides an tubular O-shaped cross section for the end wall 13. The corresponding bellows of the one-piece component can then also be correspondingly formed to have a similar tubular O-shaped cross section, for being enclosed by the end wall 13. This protruding center portion can thereby be used to clamp the center 22 of the decoupling membrane 9 against the part 6 of the partition 3.

The center 22 of the decoupling membrane 9 can preferably have a thickness which is greater than the thickness of the remainder of the decoupling membrane disposed thereabout. As can be seen in FIG. 6, this thickness in the center could be about three times the thickness of the remainder of the decoupling membrane disposed thereabout, but this value is exemplary only, and depending on the desired decoupling characteristics of the bearing, the thicknesses of the decoupling membrane 9 can be varied. Also, the sealing bead 11 and the fastening bead 12 can have a thickness which is greater than the rest of the thickness of the one-piece component 5. These beads 11 and 12 can essentially be circular, or tear-shaped, to thereby retain the one-piece component 5 in position once the entire bearing assembly is clamped together.

The size of the protruding portion 41 of the end wall 13 can also determine the available expansion space for the bellows of the one-piece component 5. In a rest configuration, the bottom end wall 13 can be spaced a distance away from the bottom of the bellows of the one-piece component 5, and the walls of the protruding portion 41 can be spaced a distance from the sides of the bellows. Then, upon compression of the bearing, the fluid could be pushed out of chamber 1 into chamber 2 to expand the bellows to a point at which contact occurs with the bottom end wall 13 and the side walls of the protruding portion 41.

The bottom end wall 13 can also be configured with an extending flange 35, extending radially away from the bearing axis 8a. This flange 35 can have at least one hole 36 therethrough for providing a means for fastening the end wall to an object, such as possibly a frame of a motor vehicle. The configuration of holes 36 about the circumference of the flange 35 can be varied to meet the requirements of the fastening in which the bearing would be installed. For example, three holes 36 could be arranged in a triangular configuration about the bearing, or four holes could be arranged in a square configuration. Alternatively, a symmetrical configuration of holes would not be necessary if space limitations required other, non-symmetrical configurations.

An alternative configuration of the bearing of the present invention could be configured without a decoupling membrane 9. In such a configuration, the one-piece component 5 would essentially only comprise the bead 11, the bellows portion forming at least part of the chamber 2, and the fastening bead 12. Such a configuration could be used if decoupling was not necessary, to thereby even further simplify the construction of the bearing.

One feature of the invention resides broadly in a hydraulic damping elastomeric bearing with two rigid end walls opposite one another in the axial direction, and at least two cheers containing damping fluid located axially one behind the other, at least one of which has a circumferential wall designed as an elastic spring element, whereby the chambers are in communication with one another by means of at least one throttle or choke located in a partition, characterized by the fact that at least a part of at least one cheer 1, 2 and at least a part of the partition 3 are designed as a one-piece component 5.

Another feature of the invention resides broadly in an elastomeric bearing characterized by the fact that at least a part of the wall of the throttle passage 4 forms part of the one-piece component 5.

Yet another feature of the invention resides broadly in an elastomeric bearing characterized by the fact that the one-piece component 5 is manufactured from elastic material.

Still another feature of the invention resides broadly in an elastomeric bearing characterized by the fact that the partition 3 consists of at least two metal parts 6, 7 and the one-piece component 5.

Another feature of the invention resides broadly in an elastomeric bearing characterized by the fact that the metal parts 6, 7 are designed in a disc shape and form a throttle passage 4 which runs in a ring-like fashion around the bearing axis 8.

Still another feature of the invention resides broadly in an elastomeric bearing characterized by the fact that a metal part 6 is designed as an outer part and an additional metal part 7 is designed as an inner part for the throttle passage 4.

Yet another feature of the invention resides broadly in an elastomeric bearing characterized by the fact that the one-piece component 5 is designed as a decoupling (anti-resonant?) membrane 9, as an equalization cheer 10 and as a seal 11 and fastening element 12.

Another feature of the invention resides broadly in an elastomeric bearing characterized by the fact that one of the metal parts 6, 7 acts as a stop for the decoupling membrane 9.

Still another feature of the invention resides broadly in an elastomeric bearing characterized by the fact that one of the end walls 13 has a contour running directly or indirectly toward the partition 3, so that a stop is formed for the decoupling membrane 9.

Yet another feature of the invention resides broadly in an elastomeric bearing characterized by the fact that the one-piece component 5 is positively fixed in the vicinity of the bearing axis 8 of the elastomeric bearing between one of the metal parts 6 and one of the end walls 13.

Another feature of the invention resides broadly in an elastomeric bearing characterized by the fact that when a throttle passage 4 is used which runs in a ring-like fashion around the bearing axis 8, a part 14 of the one-piece component 5 projects into the throttle passage 4 and separates the entry opening 15 and the exit opening 15 from one another.

Still another feature of the invention resides broadly in an elastomeric bearing characterized by the fact that the one-piece component 5 has a bypass 17 located parallel to the throttle passage 4.

Another feature of the invention resides broadly in an elastomeric bearing characterized by the fact that the bypass 17 operates as a function of the pressure.

Yet another feature of the invention resides broadly in an elastomeric bearing characterized by the fact that there is an elastomeric lip 18 as the bypass 17.

Still another feature of the invention resides broadly in an elastomeric bearing characterized by the fact that the decoupling membrane 9 is located centrally and the equalization chamber 10 runs in a ring-like fashion around the bearing axis 8.

Another feature of the invention resides broadly in an elastomeric bearing characterized by the fact that the decoupling membrane 9 runs in a ring-like fashion around the bearing axis 8 and the equalization chamber 10 is located centrally.

Still another feature of the invention resides broadly in an elastomeric bearing characterized by the fact that the one-piece component 5 is buttoned into one of the disc-shaped components 6, 7.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydraulic damping elastomeric bearing for being mounted between and reducing transmission of vibration between at least two objects, said bearing having a longitudinal axis, said bearing comprising:

first means for attaching said bearing to one of said at least two objects;

second means for attaching said bearing to another of said at least two objects;

means for connecting said first means for attaching to said second means for attaching, said connecting means comprising:

cavity means disposed within said connecting means, said cavity means including at least two chambers, said at least two chambers comprising damping fluid therein, and said at least two chambers comprising a first chamber disposed adjacent said first means for attaching and a second chamber disposed adjacent said second means for attaching;

a resilient member disposed between said first means for attaching and said second means for attaching, said resilient member having an interior surface forming at least part of said first chamber;

means for separating said at least two chambers, said means for separating comprising:

a throttle passage connecting said at least two chambers for passage of fluid between said at least two chambers;

a first surface disposed towards said first chamber;

a second surface disposed towards said second chamber;

a first member disposed between said at least two chambers; and a second member disposed adjacent said first member, said throttle passage being formed between at least a portion of said first member and at least a portion of said second member; and a one-piece component forming at least a part of each of: said means for separating said at least two chambers, at least one of said at least two chambers, and the throttle passage, said one-piece component comprising:

an elastomeric material;

a first portion for forming said at least a part of said means for separating said at least two chambers; and a second portion for forming at least a part of said second chamber, said second portion of said one-piece component comprises an expandable bellows for forming said at least a part of said second chamber;

said first means for attaching, said at least two chambers and said second means for attaching are substantially aligned along the longitudinal axis of said bearing;

said first member and said second member of said means for separating comprise disc-shaped members;

said disc-shaped members define an outer periphery;

said throttle passage is ring-shaped;

said throttle passage is disposed between said first disc-shaped member and said second disc-shaped member in the vicinity of the outer periphery of the disc-shaped members; and said first portion of said one-piece component forming a seal between said first member and said second member to seal said throttle passage between said first member and said second member.

2. The hydraulic damping bearing according to claim 1, wherein:
said connecting means further comprises a decoupling membrane disposed within said cavity means adjacent said second surface of said means for separating;
said decoupling membrane being disposed spaced apart from said second surface of said means for separating to form an anti-resonance chamber therebetween;
said one-piece component additionally comprises a third portion; and
said third portion of said one-piece component forms said decoupling membrane.

3. The hydraulic damping bearing according to claim 2, wherein:
said means for separating comprises at least one orifice therein;
said at least one orifice being open to said first chamber and to said anti-resonance chamber for allowing fluid flow between said first fluid chamber and said anti-resonance chamber;
said decoupling membrane being movable towards and away from said means for separating as a function of a fluid pressure in said first chamber to minimize resonance vibrations of said bearing.

4. The hydraulic damping bearing according to claim 3, wherein:
said second surface of said means for separating comprises a first stop means for limiting movement of said decoupling membrane towards said second cheer; and
said bearing further comprises a second stop means for limiting movement of said decoupling membrane away from said second chamber.

5. The hydraulic bearing according to claim 4, wherein:
said second means for attaching comprises a cylindrical portion adjacent said second chamber and extending towards said decoupling membrane;
said cylindrical portion having an end surface adjacent said decoupling membrane; and
said end surface of said cylindrical portion comprises said second stop means.

6. The hydraulic damping bearing according to claim 5, wherein:
said ring-shaped throttle passage is disposed concentrically around said decoupling membrane;
said second chamber is ring-shaped;
said ring-shaped second chamber is disposed concentrically around said decoupling membrane; and
said cylindrical portion of said second means for attaching is disposed interior to said ring-shaped second chamber towards said bearing axis.

7. The hydraulic damping bearing according to claim 6, wherein:
said decoupling membrane is disc-shaped and disposed radially about said bearing axis;
said decoupling membrane comprising a thickened bead in the vicinity of the bearing axis; and
said thickened bead of said decoupling membrane being positively fixed between said second surface of said means for separating and said end surface of said cylindrical portion of said second means for attaching to thereby inhibit movement of said decoupling membrane in the vicinity of the bearing axis.

8. The hydraulic damping bearing according to claim 7, wherein:
said throttle passage comprises:
a first opening connecting said throttle passage to one of said at least two fluid cheers;
a second opening connecting said throttle passage to another of said at least two fluid cheers;
said first opening and said second opening being spaced apart from one another along the outer periphery of the disc-shaped members;
said one-piece component additionally comprises a third portion projecting from said first portion into said throttle passage to at least partially block said throttle passage between said first opening and said second opening to channel damping fluid through said throttle passage along a first path between said first opening and said second opening.

9. The hydraulic damping bearing according to claim 8, wherein:
said third portion of said one-piece component projecting into said throttle passage comprises a fluid bypass passage disposed therein;
said fluid bypass defining a second path of travel between said first opening and said second opening;
said fluid bypass comprising valve means disposed in said fluid bypass, said valve means being configured to open and close said bypass as a function of a pressure of said damping fluid in said throttle passage.

10. The hydraulic damping bearing according to claim 9, wherein:
said fluid bypass valve comprises elastomeric flap means disposed across said fluid bypass, at least a portion of said elastomeric flap being displaceable as a function of fluid pressure to open said fluid bypass;
said resilient member comprises an elastomer;
said resilient member having an interior surface disposed adjacent said first chamber and an exterior surface disposed away from said first chamber;
said interior surface of said resilient member comprises an at least partially conical surface, and said exterior surface of said resilient member comprises an at least partially conical surface;
an angle of conicity for said interior surface being about 24°, and an angle of conicity for said exterior surface being about 53°;
said interior surface of said resilient member comprising a cylindrical extending portion extending towards said means for separating;
said resilient member defines an outer peripheral surface disposed concentrically about said bearing axis;
a thickness of said resilient member increases from said outer peripheral surface towards said bearing axis;
said thickness of said resilient member at said bearing axis being greater than about twice the thickness of said resilient member at said outer peripheral surface;
said first means for attaching being at least partially embedded in said elastomer of said resilient member and extending from said exterior surface of said resilient member;

said first means for attaching comprising:
- a cylindrical metal block substantially embedded in said elastomer of said resilient member;
- said cylindrical metal block having a bore therein along the bearing axis;
- bolt means disposed through said bore of said cylindrical metal block, said bolt means having a ribbed head portion; and
- said bore of said cylindrical metal block having a first portion for passage of said bolt means therethrough and a second portion for receiving said ribbed head portion of said bolt means, said second portion of said bore and said ribbed head portion of said bolt means being configured to inhibit turning of said bolt means within said cylindrical metal block;

said resilient member comprising a cup-shaped reinforcement disposed about said cylindrical metal block;

said elastomer of said resilient member being disposed between and intimately bonded to each of said cylindrical block and said cup shaped reinforcement;

said exterior surface of said resilient member between said cup shaped reinforcement and said cylindrical block comprises a circular groove;

said connecting means further comprises a cylindrical connecting flange;

said cylindrical connecting flange has a first end and a second end, said first end being flared outwardly away from said bearing axis at an angle of about 18°, and said second end comprising a step stepped outwardly from said bearing axis;

said second means for attaching comprises a cylindrical tube-shaped connecting means having a tubular trough for receiving said second cheer therein, and an external flange extending away from said bearing axis;

said external flange being disposed substantially perpendicularly to said bearing axis;

said external flange comprises holes therein for receipt of fastening devices therethrough;

said tubular trough comprising a top portion disposed adjacent said means for separating, and a bottom portion disposed away from said means for separating;

said tubular trough defining an interior surface of said second connecting means, said interior surface having a first substantially cylindrical wall disposed towards said bearing axis and a second substantially cylindrical wall spaced apart from said first cylindrical wall away from said bearing axis;

said second cylindrical wall comprising a step, stepped outwardly from said bearing axis, said step of said second cylindrical wall being configured to receive said step of said cylindrical connecting flange therein;

said means for separating and said one piece component each comprising a portion for being clamped between said step of said second cylindrical wall and said step of said cylindrical connecting flange;

said second means for attaching comprising means for retaining said step of said cylindrical connecting flange within said step of said second cylindrical wall, said means for retaining comprising tabs for engaging said step of said cylindrical connecting flange;

said first member of said means for separating comprises a dome shaped disc;

said bearing having a diameter, and said dome shaped first member having a periphery and a diameter, said dome shaped first member extending completely across said diameter of said bearing;

said second member of said means for separating comprising a disc having a cut-away center;

said second member having a periphery and a diameter, and said diameter of said second member being substantially the same as said diameter of said dome shaped first member;

beginning at said periphery of each of said first member and said second member, each of said first member and said second member comprise:
- a first portion for being clamped between said step of said cylindrical connecting flange and said step of said second cylindrical wall of said second means for fastening; and
- a second portion diverging away from the second portion of the other of said first member and said second member to form said throttle channel therebetween;

said second member further comprises inwards of said second diverging portion, a portion which converges towards said first member to clamp said second portion of said one-piece component between said first member and said second member;

said decoupling membrane of said one piece component extends across said cut-away center of said second member;

said bottom of said tubular trough of said second means for attaching being spaced apart from said expandable bellows forming said second chamber to provide expansion space for said expandable bellows;

said bottom of said tubular trough of said second means for attaching comprising an expansion limit for limiting expansion of said expandable bellows;

said decoupling membrane having a first surface disposed towards said first chamber and a second surface disposed opposite to said first surface;

said second means for attaching comprising at least one opening therein for exposing said second surface of said decoupling membrane to atmospheric pressure; and said throttle passage extends substantially completely about said periphery of said first member and said second member.

11. The hydraulic damping bearing according to claim 3, wherein:
- said first member of said means for separating comprises a dome shaped disc;
- said bearing having a diameter, and said dome shaped first member having a periphery and a diameter, said dome shaped first member extending completely across said diameter of said bearing;
- said second member of said means for separating comprising a disc having a cut-away center;
- said second member having a periphery and a diameter, and said diameter of said second member being substantially the same as said diameter of said dome shaped first member;
- said decoupling membrane of said one piece component extends across said cut-away center of said second member adjacent to and spaced apart from said first member;

said first member comprising a central orifice therethrough in the vicinity of the bearing axis;

said decoupling membrane comprising a projection extending from said decoupling membrane in the vicinity of the bearing axis; and said projection of said decoupling membrane having a first end configured to be disposed through and retained in said central opening of said first member to limit movement of said decoupling membrane, said central opening having a diameter, and said first end of said projection having a diameter, said diameter of said first end being greater than said diameter of said central opening.

* * * * *

UNITED STATES PATENT AND TRADEMARK OFFICE
CERTIFICATE OF CORRECTION

PATENT NO. : 5,340,094   Page 1 of 2
DATED : August 23, 1994
INVENTOR(S) : Georg SCHYBOLL et al.

It is certified that error appears in the above-indentified patent and that said Letters Patent is hereby corrected as shown below:

In column 1, line 10, after 'two' delete "cheers" and insert --chambers--.
In column 2, line 29, after 'equalization' delete "cheer" and insert --chamber--.
In column 5, line 9, after 'component' insert --5--.
In column 5, line 34, after 'the' delete "loren" and insert --form--.
In column 5, line 59, after 'is' delete "shogun" and insert --shown--.
In column 7, line 34, after 'the' first occurrence, delete "cheer" and insert --chamber--.
In column 7, line 37, after 'the' delete "cheers" and insert --chambers--.
In column 8, line 41, after 'two' delete "cheers" and insert --chambers--.
In column 8, line 47, after 'one' delete "cheer" and insert --chamber--.
In column 9, line 7, after 'equalization' delete "cheer" and insert --chamber--.
In column 11, line 36, Claim 4, delete "cheer" and insert --chamber--.
In column 12, line 8, Claim 8, after 'fluid' delete "cheers;" and insert --chambers;--. 12.

UNITED STATES PATENT AND TRADEMARK OFFICE
CERTIFICATE OF CORRECTION

PATENT NO. : 5,340,094                           Page 2 of 2
DATED      : August 23, 1994
INVENTOR(S): Georg Schyboll et al.

It is certified that error appears in the above-indentified patent and that said Letters Patent is hereby corrected as shown below:

Column 12, line 10, claim 8, after 'fluid' delete "cheers;" and insert —chambers;—.

Signed and Sealed this

Sixteenth Day of May, 1995

Attest:

Attesting Officer

BRUCE LEHMAN

Commissioner of Patents and Trademarks